3,125,415
MANUFACTURE OF SULFAMIC ACID
Everett E. Gilbert and Alphonso W. Marsilio, Morris Township, Morris County, N.J., assignors to Allied Chemical Corporation, New York, N.Y., a corporation of New York
No Drawing. Filed Feb. 19, 1962, Ser. No. 174,273
3 Claims. (Cl. 23—166)

This invention relates to the manufacture of sulfamic acid and more particularly to a new and improved process for producing sulfamic acid by reacting urea, sulfur trioxide and sulfuric acid.

Although the reaction of sulfuric acid, sulfur trioxide and urea was known—Baumgarten, U.S. Patent 2,102,350, Ber., 69B, 1929, 37—from a practical commercial operation many problems were encountered due to the inherent nature of the reaction which is strongly exothermic and normally proceeds with considerable violence. In addition the resultant product, sulfamic acid is a relatively high melting point chemical, 205° C., and consequently presents a serious problem with respect to processing and separation of the sulfamic acid from the reaction products as well as heat transfer. Various methods have been proposed to overcome these processing problems with indifferent success. In one suggestion it has been proposed to premix the reagents at a temperature below that required for the formation of sulfamic acid followed by heating to the higher temperature necessary for it to occur. According to this procedure, the exothermic effect of the reaction is minimized, however, new problems are created since this two-step process requires costly apparatus, is time consuming, and also employs brine cooling, an expensive procedure, to keep the temperature within the required low range of the initial premix. Another suggestion was to use excess sulfuric acid which permitted the reaction to be carried out in a liquid phase thereby providing a means for dissipating the heat. This procedure however, did not ameliorate all the difficulties and indeed created new problems. More specifically, sulfuric acid being a reactant did not avoid the violence of the reaction and resulted in a slurry of sulfamic acid in sulfuric acid solution from which it was most difficult to separate the sulfamic acid. Furthermore, there remained in the product sulfamic acid amounts of sulfuric acid which was also most difficult to remove. In addition the operation was complicated by corrosion problems brought about by the many different strengths of sulfuric acid involved. In another attempt to overcome the problems, a large excess sulfur trioxide also a reactant, was used as a reaction medium where again it was found difficult to control the reaction and also to remove residual sulfur trioxide from the product. Furthermore, the use of a large excess sulfur trioxide necessitates pressure equipment in the desired temperature range for forming sulfamic acid thereby appreciably increasing the cost of capital investment. Other solvent mediums were also tried but found wanting for one or more of the above reasons.

An object of the present invention is to provide an efficient economical process for producing sulfamic acid by reacting urea, sulfur trioxide and sulfuric acid. Another object is to obtain a good control of the reaction of urea, sulfur trioxide and sulfuric acid and to permit easy separation of sulfamic acid from the reaction mixture. A further object is to eliminate the need for the two-step procedure of the prior art i.e., premixing the reagents at a low temperature to inhibit sulfamic acid formation followed by heating at higher temperatures necessary for it to occur. Other objects and advantages will be apparent from the following description.

In consideration of a good practical commercial process for producing sulfamic acid several factors must be taken into account. For good economical operation the process should not be time consuming and desirably should be conducted at substantially atmospheric pressure to avoid use of pressure equipment. In addition the process should utilize a solvent which is inert to the reactants and which serves to dissipate the exothermic heat of reaction. The raw materials should be soluble in the solvent and the formed product insoluble in it so that it can easily be separated from the reaction mixture.

In our investigation for a solution to the problem of commercially producing sulfamic acid we tried various solvent mediums but found that some were reactive and consequently unsuitable because they contaminated the product. Others which were inert to the reactants either were of such high boiling point as to require special means for dissipation of heat, complicated separation techniques, or were so volatile as to necessitate pressure equipment.

One of the compounds investigated was chlorosulfonic acid, a readily available, chemically stable compound. Chlorosulfonic acid being very similar to sulfonic acid in chemical behavior would be expected to cause the same type difficulties in the recovery of sulfamic acid by filtration as heretofore indicated. Further, according to U.S. Patent 2,109,952 this compound was used as a reactant together with urea to form sulfamic acid and consequently would not be expected to perform as a solvent inert to the reactants. However, we did try chlorosulfonic acid as a solvent medium in the reaction of urea, sulfuric acid and sulfur trioxide and surprisingly and contrary to normal expectations found that chlorosulfonic acid is an excellent reaction medium within the difficultly controllable reaction can be easily regulated and high yield of easily recoverable sulfamic acid obtained. Furthermore, use of chlorosulfonic acid as the solvent medium for the reactants permits control of the reaction economically by a readily available cooling medium such as river water. Moreover, it can easily and conveniently be removed from the product sulfamic acid by gently heating in vacuo and advantageously returned to the process.

In accordance with the present invention sulfamic acid may be prepared in an efficient and economical manner with yields of 90%, or higher, by gradually adding urea to a mixture of sulfur trioxide and sulfuric acid in the presence of chlorosulfonic acid over a short period of time, such as from 5 minutes to 2 hours, preferably about 20 minutes, maintaining the temperature during addition within the range of about 60 to 85° C., preferably 75 to 80° C. under substantially atmospheric pressure, thereafter raising the temperature to about 80 to 95° C. preferably 85 to 90° C. and continuing the reaction for about 10 minutes to about 3½ hours, generally about 30 minutes until substantial completion of the reaction of urea, sulfur trioxide and sulfuric acid as indicated by the cessation of carbon dioxide gas and thereafter recovering by filtration the formed sulfamic acid.

Procedurally, urea preferably in solid form, i.e., crystalline, powder or pellet form, is added to a mixture of sulfur trioxide, sulfuric acid and chlorosulfonic acid with agitation over a short period of time at temperatures conducive to the formation of sulfamic acid followed by a "digestion phase" i.e., the time necessary to complete the reaction after total addition of urea. The temperature during the addition of urea to the mixture of sulfur trioxide, sulfuric acid and chlorosulfonic acid should be such that sulfamic acid is formed and precipitated in chlorosulfonic acid while the urea is being added. To accomplish this, the sulfuric acid, sulfur trioxide and chlorosulfonic acid may be preheated and thereafter brought together, or they may be introduced into a heated zone wherein the necessary sulfamic acid forming temperature is maintained. We have found that a temperature of at least about 60° C. is suitable for this purpose. On the other hand, it is well to keep the temperature below about 85° C. during the addition of urea since above this temperature the formation of sulfamic acid may be too rapid and may result in too rapid heat liberation and possible hazardous operating conditions. The external cooling necessary to maintain the reaction mixture temperature within the range indicated may be simply and conveniently accomplished by any suitable cooling apparatus such as a jacket surrounding the reaction vessel through which a cooling medium such as river water flows. By maintaining suitable control of the temperature within this range i.e., 60–85° C., under substantially atmospheric pressure, the rate of reaction during addition of urea to sulfuric acid, sulfur trioxide and chlorosulfonic acid may be regulated such that the reaction proceeds smoothly and simply without hazard of explosion or other difficulty.

The time necessary for completing the addition phase i.e., the total addition of urea to the sulfur trioxide, sulfuric acid and chlorosulfonic acid is variable and depends upon the temperatures involved. Generally, by using higher temperatures within the temperature range there is a decrease in the time required to complete the addition phase. We have found that the process of the invention may be efficiently carried out by adding the urea to the sulfur trioxide, sulfuric acid and chlorosulfonic acid over a period of time which is variable between about 5 minutes to about 2 hours depending on the temperature utilized. After the addition of urea is complete, agitation is continued and is maintained throughout the digestion phase and for a slight period thereafter. It is desirable to increase the temperature slightly after the addition of urea is complete so that the formation of sulfamic acid may be accelerated. Temperatures in the range of about 80 to 95° C. preferably about 85 to 90° C. are suitable for this purpose and such temperatures are effectively arrived at by either decreasing the flow of the cooling medium to permit the heat of the reaction to build up to the required temperatures, or on the other hand by applying external heating to the reaction vessel.

The time necessary to complete the digestion phase is also variable, depending on the temperatures utilized. Thus, by employing temperatures in the range of about 80 to 90° C., the total time for completing the reaction after the addition of urea is complete runs from about 20 minutes to about 3 hours. The reaction is generally complete upon the cessation of evolved by-product carbon dioxide.

Other conditions which effect the yield of sulfamic acid is the proportion and concentration of the reactants. Optimum yields of sulfamic acid are obtained when the reactants urea, sulfur trioxide and sulfuric acid are used in such proportions that substantially equimolar equivalent quantities are ultimately present i.e., for each mol of urea there is one mol of sulfuric acid and one mol of sulfur trioxide. If a large excess of sulfuric acid is used it turns up as impurity in the crude product, whereas if sulfuric acid is deficient, the product contains unreacted urea. The proportions of sulfur trioxide used may be somewhat in excess of the calculated proportion theoretically required since carbon dioxide is evolved during the reaction, and excess sulfur trioxide present may be carried off with the evolved carbon dioxide. In practice, a molar ratio of sulfur trioxide to urea in the order of about 1.3 to 1 gave satisfactory results. Although molar ratios in excess of this amount are operable, no advantage is obtained by using them. Concentrations of chlorosulfonic acid, the reaction medium, should be such that the slurry which is formed by the precipitation of sulfamic acid is easily managed. In addition, there should be enough solvent present to provide effective dissipation of the heat which is formed. For these purposes, molar ratios of chlorosulfonic acid to urea in the range of 1–2 mols or more chlorosulfonic acid per mol urea are suitable, preferably a ratio of 1.2–1.5 to 1. Below this molar range the thickened reaction slurry creates manipulating problems and tends to complicate the satisfactory separation of the formed sulfamic acid. More than 2 mols of chlorosulfonic acid may be used per mol of urea, say up to 10 mols or more but without enhanced ease of the control over the reaction which is a feature of the invention.

As mentioned previously, sulfamic acid is formed upon the addition of urea to sulfur trioxide, sulfuric acid and chlorosulfonic acid and begins to precipitate in the chlorosulfonic acid medium due to its insolubility in it. The separation of sulfamic acid product from the reaction medium can be effected by any suitable means such as by filtration or centrifuge. However, filtration is preferred because of the ease and rapidity with which the separation takes place. Slight traces of chlorosulfonic acid remaining in the product sulfamic acid can be conveniently removed simply by heating the product at about 150–160° C. at atmospheric pressure causing vapors of chlorosulfonic acid to evolve which are condensed and recovered or advantageously returned to the process. If desired, the sulfuric acid may be first premixed with urea with stirring and cooling to below about 80° C. to form urea bisulfate and the bisulfate maintained in liquid form at a temperature of about 80 to 85° C. added to the sulfur trioxide and chlorosulfonic acid. In this procedure, the temperature during addition is desirably maintained between 75° and 80° C. for 10 to 20 minutes followed by temperatures for the digestion phase of 80° to 90° C. for 10 to 20 minutes. The product sulfamic acid is separated from the reaction mixture in the same manner as heretofore explained.

The following examples illustrate the present invention.

*Example 1*

118 parts sulfuric acid, 126 parts sulfur trioxide and 199 parts chlorosulfonic acid were placed in a reaction vessel equipped with provision for stirring and external heating and cooling. The mixture was heated to 75° C. 72 parts of urea in powder form were then added portion-wise over a period of about 18 minutes into the vessel. Carbon dioxide evolution was immediate upon the addition of each portion. Slight external cooling was employed to hold the reaction mixture in the range of 75° to 80° C. After addition, the temperature was increased to 85° to 90° C. where it was held to complete the reaction. This required about 20 minutes, as indicated by complete cessation of carbon dioxide evolution. Stirring was, however, continued an additional 10 minutes. Sulfamic acid being quite insoluble in chlorosulfonic acid, began to separate from the beginning of urea addition and no difficulty was encountered since the slurry was easy to stir throughout. The slurry was filtered to recover the desired solid sulfamic acid. Filtration was found to occur easily and rapidly. The filtrate chlorosulfonic acid was recovered. A 91% yield of sulfamic acid based on urea was obtained.

*Example 2*

60 parts urea were mixed with 98 parts sulfuric acid (100%) with stirring and cooling to below 85° C. forming the urea bisulfate. Moisture was carefully excluded. The bisulfate, maintained in liquid form by heating at 85° C. was then added gradually to a mixture of 138 parts sulfur trioxide and 165 parts chlorosulfonic acid with stirring and external cooling using the apparatus and procedure detailed in Example 1.

A 92% yield of sulfamic acid based on urea was obtained.

Although certain preferred embodiments of the inven-

We claim:

1. A process for the production of sulfamic acid which comprises mixing urea and sulfuric acid and sulfur trioxide and chlorosulfonic acid, maintaining the mixture at a temperature within the range of 60–95° C. to effect reaction of the mixture to produce sulfamic acid which is insoluble and forms a slurry in the chlorosulfonic acid and also by-product carbon dioxide, releasing evolved carbon dioxide from the reaction mixture, and separating sulfamic acid from the chlorosulfonic acid.

2. A process for the production of sulfamic acid which comprises adding urea to a mixture of sulfuric acid, sulfur trioxide and chlorosulfonic acid in an enclosed reaction zone under substantially atmospheric pressure, maintaining the reaction mixture during addition of urea at a temperature within the range of 60–80° C. to effect reaction of urea, sulfuric acid and sulfur trioxide to produce sulfamic acid and by-product carbon dioxide, thereafter increasing and maintaining the temperature in the reaction zone after total urea addition within the range of 80–95° C. until substantial completion of the reaction of urea, sulfuric acid and sulfur trioxide, discharging evolved carbon dioxide and recovering sulfamic acid from chlorosulfonic acid.

3. A process for the production of sulfamic acid which comprises adding urea to a mixture of sulfuric acid, sulfur trioxide and chlorosulfonic acid in the proportion of substantially equimolar quantities of urea and sulfuric acid and 1.0–1.3 mols sulfur trioxide and 1–2 mols chlorosulfonic acid, maintaining the mixture at a temperature within the range of 60–80° C. in an enclosed reaction zone under substantially atmospheric pressure to effect reaction of urea, sulfuric acid and sulfur trioxide to produce sulfamic acid and by-product carbon dioxide, thereafter increasing and maintaining the temperature in the reaction zone after total urea addition within the range of 80–95° C. until substantial completion of the reaction of urea, sulfuric acid and sulfur trioxide, discharging evolved carbon dioxides, filtering the reaction products of sulfamic acid in chlorosulfonic acid to separate sulfamic acid, and returning the chlorosulfonic acid filtrate for admixture with additional sulfur trioxide, sulfuric acid and urea.

References Cited in the file of this patent

UNITED STATES PATENTS

| | | |
|---|---|---|
| 2,109,952 | Wyler | Mar. 1, 1938 |
| 2,408,823 | Tauch | Oct. 8, 1946 |
| 2,436,658 | McQuard | Feb. 24, 1948 |